April 18, 1933. C. H. CHAPIN 1,904,040
SHOCK ABSORBER
Filed June 17, 1930 3 Sheets-Sheet 1
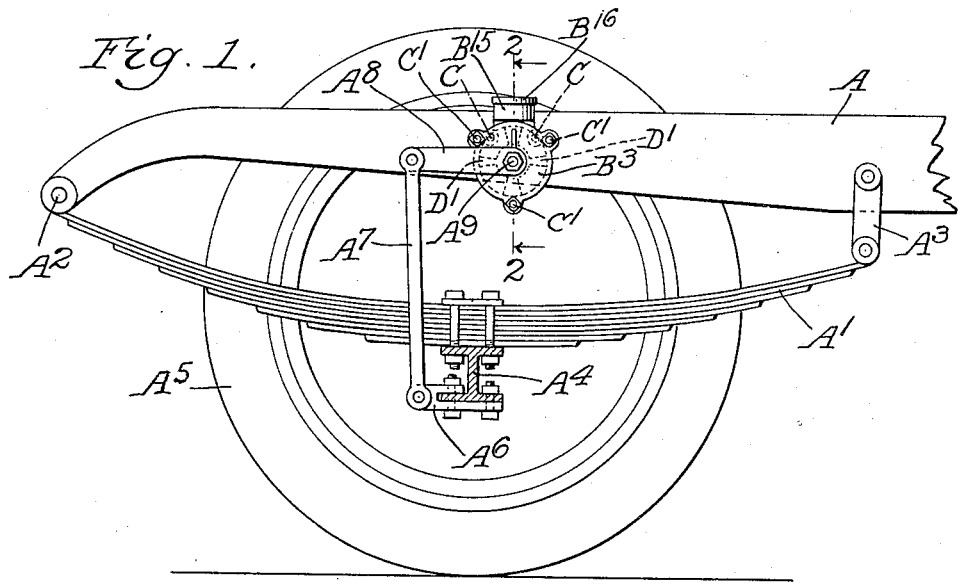
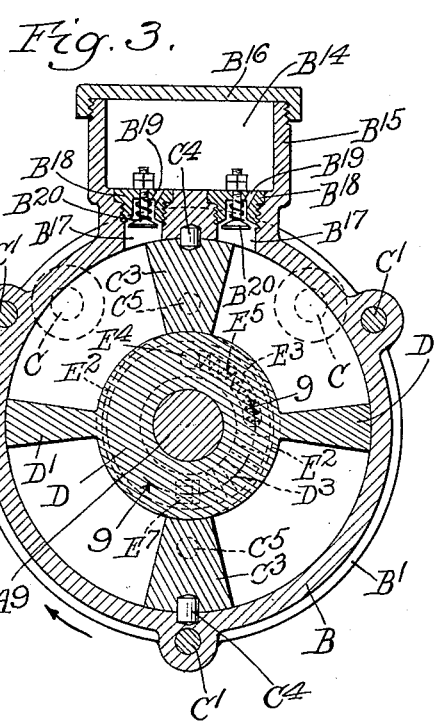
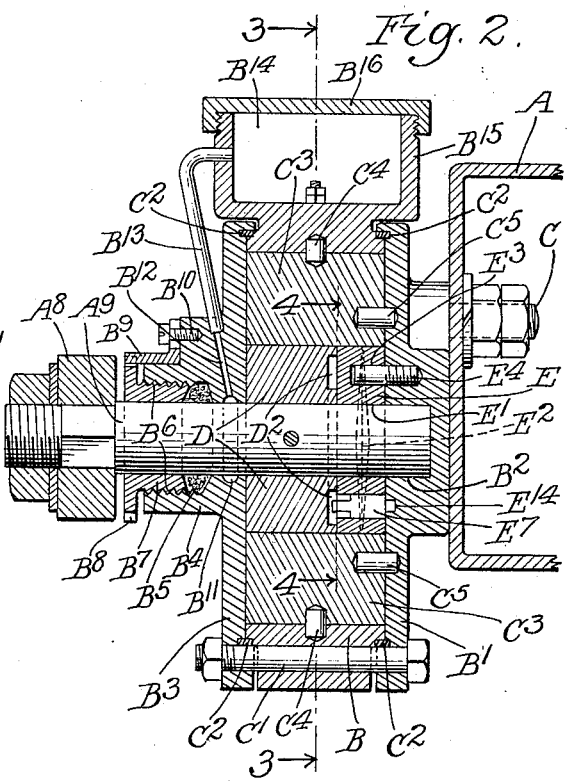
Inventor
Charles H. Chapin
by Parker & Carter
Attorneys April 18, 1933. C. H. CHAPIN 1,904,040
SHOCK ABSORBER
Filed June 17, 1930 3 Sheets-Sheet 2
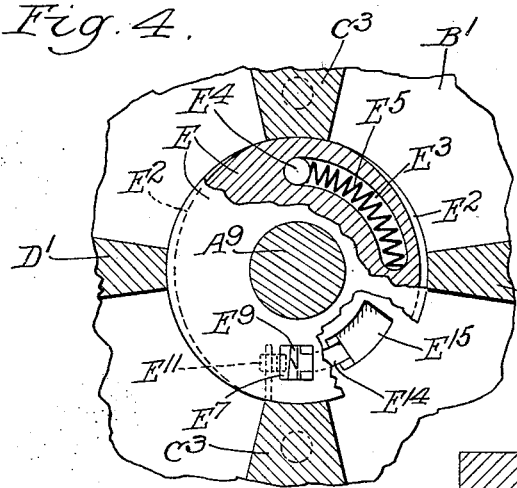
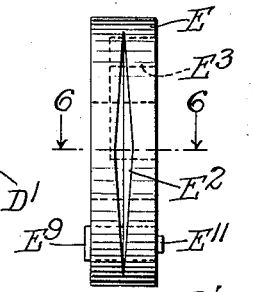
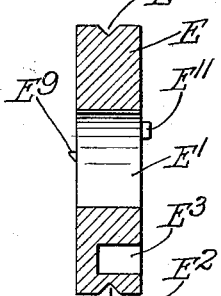
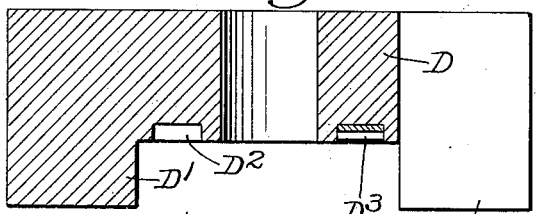
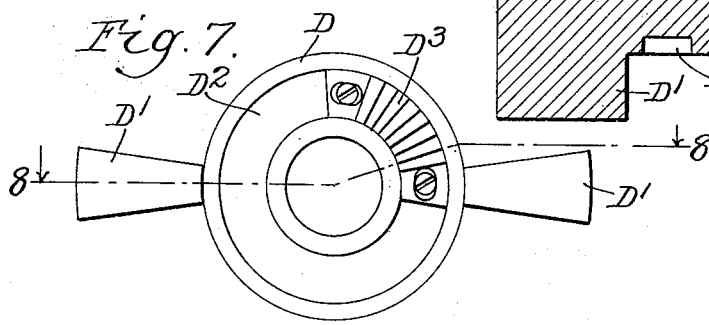
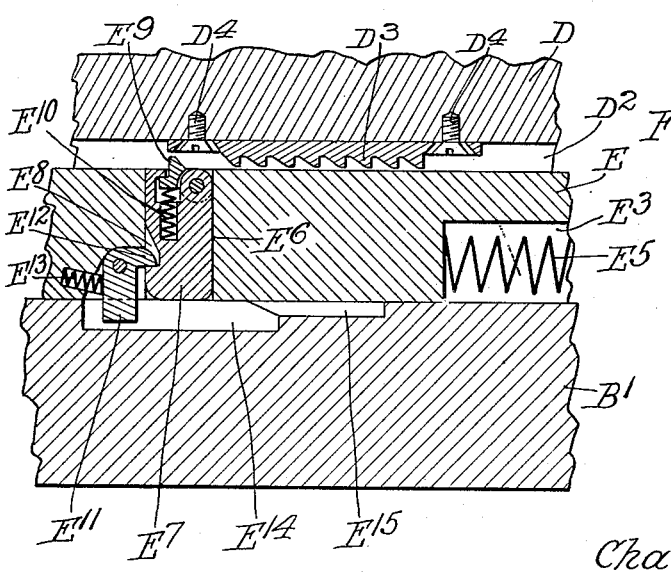
Inventor
Charles H. Chapin
by Parker & Carter,
Attorneys.

April 18, 1933. C. H. CHAPIN 1,904,040
SHOCK ABSORBER
Filed June 17, 1930 3 Sheets-Sheet 3
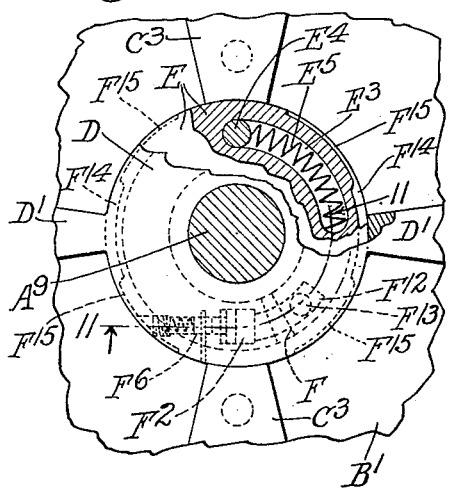
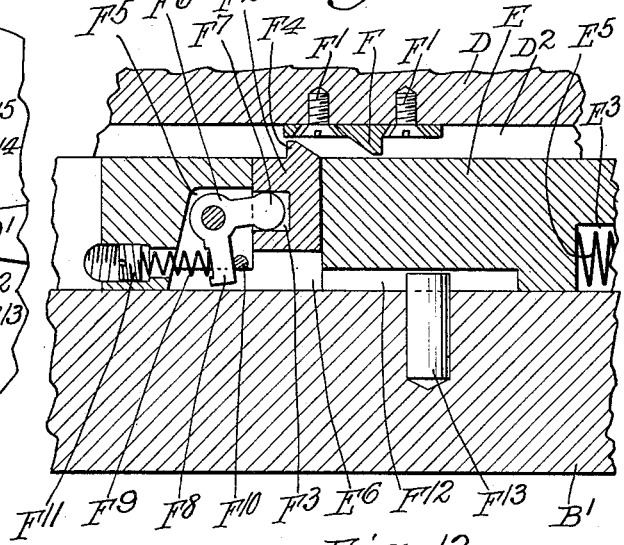
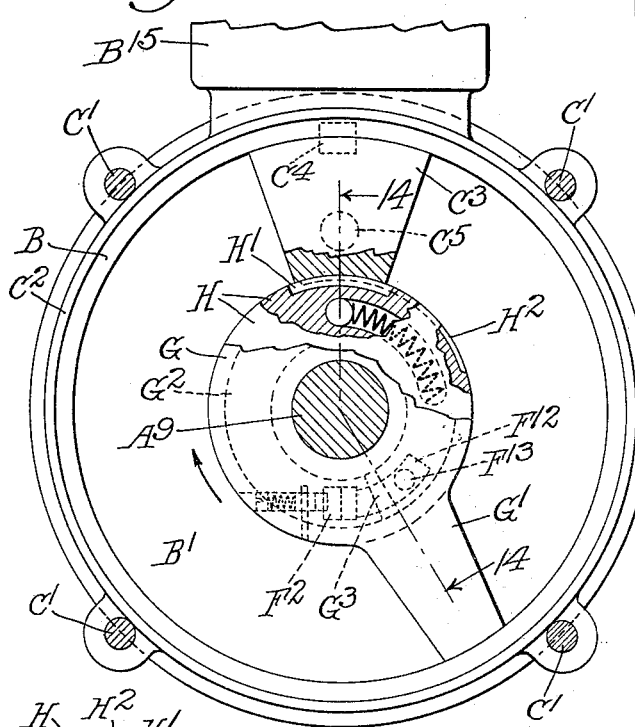
Inventor
Charles H. Chapin
by Parker & Carter
Attorneys Patented Apr. 18, 1933

1,904,040

UNITED STATES PATENT OFFICE

CHARLES H. CHAPIN, OF CHICAGO, ILLINOIS

SHOCK ABSORBER

Application filed June 17, 1930. Serial No. 461,705.

This invention relates to a shock absorber for use in connection with vehicles. It is designed to reduce and control the motion of the vehicle in response to roughness of the road surface over which the vehicle travels. The shock absorber is of particular importance when applied to an automotive vehicle.

One object of the invention is to provide a shock absorber in which a progressively increasing resistance is provided. Another object is to provide such a progressively increasing resistance without the use of valves.

Other objects will appear from time to time in the specification and claims.

My invention is illustrated more or less diagrammatically in the accompanying drawings, wherein:

Figure 1 is a side elevation of one part of a vehicle frame with my shock absorber installed and with parts in section;

Figure 2 is a transverse vertical cross section taken on an enlarged scale on line 2—2 of Figure 1;

Figure 3 is a vertical cross section taken on line 3—3 of Figure 2;

Figure 4 is a detailed cross section on an enlarged scale, taken at line 4—4 of Figure 2;

Figure 5 is an elevational view of the resistant control element standing alone;

Figure 6 is a transverse cross sectional view taken at line 6—6 of Figure 5;

Figure 7 is an elevational view of the moving paddle element or rotor, removed from its case;

Figure 8 is a transverse cross section taken at line 8—8 of Figure 7;

Figure 9 is a detailed transverse cross section taken at line 9—9 of Figure 3, on an enlarged scale and illustrating the means whereby the controlling element may engage the rotor;

Figure 10 is a view generally similar to Figure 4, showing a modified form of the device in which the control element is itself modified;

Figure 11 is a view generally similar to Figure 9, showing the engaging means in the modified form;

Figure 12 is an elevational view of the control member of the modified form;

Figure 13 is an elevational view of a further modified form with parts removed and parts in section;

Figure 14 is a partial transverse cross section taken on line 14—14 of Figure 13.

Fig. 15 is an elevation of a modified control member, used in the form shown in Figures 13 and 14.

Like parts are designated by like characters throughout the specification and drawings.

A indicates a portion of an automobile frame. $A^1$ is a spring fastened at one end to the frame as at $A^2$. At its other end it is fastened to the frame by means of a link $A^3$. The spring carries an axle $A^4$ which is of any suitable design and carries a wheel $A^5$. $A^6$ is a clamping member fastened to the axle $A^4$. $A^7$ is a link member pivoted at one end to the clamp $A^6$ and at its other end to a lever $A^8$ which is fixed on the shaft $A^9$ of a shock absorber. The shock absorber housing may be made in any suitable manner but is preferably formed of three parts, including a ring-like member B, a rear cover $B^1$, having a partially hollowed boss $B^2$ formed in it and a front cover $B^3$ having formed in it a boss $B^4$, which is hollow as at $B^5$ and interiorly threaded as at $B^6$. Packing may be inserted in the hollow $B^5$, forced and held into place by a packing retaining gland $B^7$ which is provided with a notched edge $B^8$ and may be held in adjusted position by means of a member $B^9$ which penetrates into a notch and is adjustably held in position by the screw $B^{10}$. The shaft $A^9$ is journaled in the hollow boss $B^2$ at one end and also in a bearing formed in the cover $B^3$. About the bearing in the cover $B^3$ is a groove $B^{11}$ which communicates by means of a passage $B^{12}$ in the body of the cover and a tube $B^{13}$, with a fluid reservoir $B^{14}$ which is provided in an enlargement $B^{15}$ of the ring-like portion B. A cover $B^{16}$ provides a removable closure for the enlargement $B^{15}$. The ring portion B is ported as at $B^{17}$ $B^{17}$, to provide communicating openings from the interior of the housing proper to the interior of the enlargement $B^{15}$. Each of the ports $B^{17}$ is suitably threaded on its interior and in each of the ports a valve cage $B^{18}$ is seated. A passageway $B^{19}$ is provided and a spring held, outward opening valve $B^{20}$ is positioned so as to control the ports $B^{17}$. As indicated, the valves are normally held open by the springs. Pressure within the housing serves to seat them in opposition to the springs. The shock absorber housing is provided with two or more attaching members C by means of which the shock absorber may be positioned on the vehicle frame A. The two covers of the shock absorber are removably held together and in position on the ring member by means of bolts $C^1$ or by any other suitable attaching means. Packing rings $C^2$ may be positioned so as to prevent leakage from the housing. Fixed within the housing of the shock absorber in the form of the invention shown in Figures 1 to 12, inclusive, are two baffles $C^3$, $C^3$. These members are substantially immovable but may be so fastened in place as to permit relatively slight movement between them and the housing. Such movement will be due to expansion and contraction of parts under temperature variations. Since it is contemplated in some forms of the invention that the baffles be made of a material different from the housing, it is preferable to join the baffles to the housing so as to permit, without strain, slight movement incident to expansion and contraction. It will be understood that ordinarily the parts are so attached to each other and so mounted together that no leakage past them occurs. Under some circumstances of extreme contraction due to extremely low temperatures, some leakage between the baffles and the housing might occur. In the form shown, the baffles are held in place by pins $C^4$ $C^4$ which engage the ring portion B of the housing and by pins $C^5$ $C^5$ which engage one of the side portions of the housing, for example, the portion $B^1$.

Fixed on the shaft $A^9$ is a rotor consisting of a hub-like portion D to which are fastened paddles $D^1$ which may or may not be integral with the hub. The paddles as shown are preferably at one end flush with the hub D and at the other end extends beyond or overhang the hub. In the portion of the hub beyond which the paddles thus extend there is preferably formed an annular groove $D^2$. Within a portion of this groove $D^2$ a rack $D^3$ is positioned. This form is illustrated generally in the first nine figures of the drawings. A modified arrangement is shown in the later figures. The rack $D^3$ may be adjustably positioned and is held in place by screws $D^4$ $D^4$ or by other means permitting of adjustment.

In the several forms of the invention there is shown an escape control member E. This member is provided with a central perforation $E^1$ of such size as to enable it to fit on the shaft $A^9$. The control member E corresponds generally in outline to the hub D of the rotor and when it is in position on the shaft its thickness, combined with the thickness of the hub D, is approximately the same as the length of the paddles $D^1$. The member E is provided with a groove $E^2$ of varying width and depth. It is preferably so made that from a central point of greatest width and depth it becomes towards its ends narrower and shallower until it finally fades out. Two such grooves are preferably formed in the member E. The member E is provided in one face with an arcuate groove $E^3$. Into this groove a pin $E^4$, which may be positioned in the cover $B^1$, penetrates. Lying within the groove $E^3$, bearing at one end against the end of the groove and at the other end against the pin $E^4$, is a compression spring $E^5$. The member E is provided with a perforation $E^6$ extending preferably clear through it. Within this perforation is positioned a movable engaging member $E^7$ which is notched as at $E^8$ and provided with a movable dog $E^9$ in one end, which may engage the teeth of the rack $D^3$. The dog $E^9$ is normally held in the raised position by a spring $E^{10}$. An operating member $E^{11}$ is pivotally mounted in the member E and is provided with a lever portion $E^{12}$ which lies within the notch $E^8$ of the member $E^7$. A spring $E^{13}$ normally holds the member $E^{11}$ in the position shown in Figure 9. There is formed preferably in the back cover plate $B^1$ an arcuate groove $E^{14}$ which communicates with a wider and shallower enlargement $E^{15}$. The portion $E^{14}$ of the groove is of substantially the same width as the member $E^{11}$.

In the form shown in Figures 10, 11 and 12, the members D and E are substantially the same as those shown in the earlier figures. The hub D is provided, however, with a single tooth F, instead of the rack $D^3$. This tooth may be adjustably positioned at any suitable point on the hub by means of screws $F^1$. The member E is provided as before with a perforation $E^6$ within which a dog $F^2$, provided with a notch or pocket $F^3$ and a tooth $F^4$, is positioned. A cavity $F^5$ is formed adjacent the perforation $E^6$. Within this is pivotally mounted a lever $F^6$ having a rounded end $F^7$ lying within the cavity $F^3$ and having an angularly disposed end $F^8$ positioned to be contacted by a compression spring $F^9$ which tends to move it into the position shown in Figure 11 and hold it against a stop $F^{10}$. The compression of the spring may be adjusted by an adjusting plug $F^{11}$. Communicating also with the perforation $E^6$ is an arcuate groove $F^{12}$ into which a pin $F^{13}$ projects. This pin is mounted in the rear cover plate $B^1$. In the form shown in Figures 10 and 12, particularly, the member E is provided with two slots somewhat different in construction from the slots or grooves $E^2$ shown in the earlier figures. The slots or grooves are formed with central tapering sections $F^{14}$ which, while shorter, may correspond generally in proportion to the grooves $E^2$ in that they are widest and deepest at their center and taper toward their ends. At each end of each of the grooves a portion $F^{15}$ of constant width and depth is formed.

As shown in Figures 13 and 14 a further modification appears. A hub G which is generally similar to the hub D is provided. It carries a single paddle $G^1$. The hub is provided with a groove $G^2$ and a single ratchet tooth $G^3$ similar to the tooth F. Since there is only a single paddle, one of the baffles $C^3$ is omitted and only a single baffle is shown.

Instead of the grooves or slots shown in the earlier forms of control member, there are formed in the control member H one relatively short and relatively deep groove $H^1$ and a longer and shallower groove $H^2$. It is to be noticed that the shortest groove $H^1$ is longer than the width of the baffle and, therefore, it provides a by-pass past the baffle. The longer and shallower groove $H^2$ is so positioned that at one end it extends beyond the end of the groove $H^1$ and at the other end stops short of it. Thus in the position shown in Figure 13, the groove $H^1$ is providing a by-pass past the baffles while the groove $H^2$ is sealed, as one end of it does not extend beyond the baffle and, therefore, in this position of the parts, it cannot provide any by-pass.

It will be realized that whereas I have herein shown and described a practical and operative device, nevertheless many changes might be made in the size, shape, number and disposition of parts without departing materially from the spirit of my invention, and I wish, therefore, that my showing be taken as in a sense diagrammatic.

The use and operation of my invention are as follows:

With the parts of the vehicle in the position as shown in Figure 1, the parts of the shock absorber in its several forms are in the position indicated generally in Figures 2, 3 and 13. In other words, the shock absorber is in what might be called a neutral position, and the vehicle is running on a smooth road. Assuming now that the vehicle strikes a bump so that the wheel is raised. The lever $A^8$ will be raised, thus rotating the shaft $A^9$ as shown in Figures 3 and 13, in a clockwise direction and moving the hub and paddle in the same direction and the direction of this rotation is indicated by arrows in the figures just mentioned. The escape control member E in this neutral position is not engaged positively by the hub D and thus a certain relative movement of the parts is possible. Minor shocks due to minor inequalities in the road surface, will merely cause a floating action, the hub and paddles moving and the member E remaining stationary. Escape of fluid past the paddles takes place through the slots or grooves $E^2$. These parts are shown in detail in Figure 4 and from that figure it will be seen that when the hub is in the neutral position the greatest width and depth of the openings $E^2$ is opposite the paddles and thus the greatest by-passing or escape of fluid is possible. A certain limited floating movement is possible and the extent of this is controlled by the position of the rack or ratchet $D^3$ and by the amount of travel permitted the hub D before one of the teeth $D^3$ passes over and is engaged by the dog $E^9$. If the movement of the hub and paddle is sufficient to engage the dog $E^9$ with one of the teeth of the rack, when the movement of the hub thereafter occurs in the reverse direction, the control member E moves with the hub. During the time when relative movement of the hub and control member takes place, the paddles carried by the hub are constantly moving along the slots $E^2$ and are thus constantly moving from the point of greatest size of the slots to a point of less size. Thus the cross sectional area of the passage through which fluid may escape is constantly being reduced and the resistance is, of course, thus increasing. As long as the hub and the paddles continue to move in the clockwise direction, there is relative movement between the control member E and the hub D, and the paddles thus move along the slots $E^2$ and the resistance is continually increased as the paddles move farther and farther toward the end of the slots $E^2$. Any tendency of the control member E to be carried along with the hub during this phase of movement is overcome by the stop $E^4$ lying within the slot $E^3$ which prevents any movement of the member E in this direction. When reverse movement of the hub and paddles takes place, the dog $E^9$, being in engagement with one of the teeth $D^3$, prevents relative movement of the parts and in this reverse or counter-clockwise movement of the hub and paddles, the control member moves for a period with the hub and thus the paddles do not move along the slots $E^2$ and the cross sectional area of the escape or by-pass passage through the slots $E^2$ is constant and so as the shock absorber reverses itself on the rebound, the maximum resistance due to the restricted by-pass area, is maintained. The control member E therefore moves with the hub and paddles in a reverse or counter-clockwise direction and the spring $E^5$ is compressed. This movement continues until the lever $E^{11}$ strikes the shoulder formed by the relatively narrow and deep cavity $E^{14}$ and the relatively wide and shallow cavity $E^{15}$. When this contact occurs, the lever is rotated to the left as indicated in Figure 9, and the nose $E^{12}$ lying within the cavity $E^8$ of the dog carrying member $E^7$, is depressed and the dog $E^9$ is thus drawn out of engagement with the tooth of the rack or ratchet $D^3$ and the control member E is thus disengaged from the hub D whereupon the spring $E^5$ is free to return the control member to its original or neutral position. I thus provide a constantly increasing resistance to the movement of the shock absorber in response to depression of the vehicle spring and I provide means for retaining the maximum resistance during the rebound movement so that as the vehicle spring is originally flattened, due for example to contact of the wheel with a bump in the road, the resistance is constantly increased and when reverse movement begins, the resistance is controlled so that the maximum resistance is retained during a predetermined part of the reverse or rebound movement.

As the device is shown in the first 9 figures, a number of teeth are shown on the ratchet $D^3$. The purpose of this is to provide for a multiplicity of bumps of increasing violence. Thus during the movement of the hub D incident to contact with the first bump the dog $E^9$ might engage the left hand tooth as shown in Figure 9. Before a sufficient rebound has occurred to cause the dog to be withdrawn from engagement with the tooth, a more pronounced bump might be encountered and the parts stepped along so that the dog $E^9$ engages a tooth farther to the right in the form shown in Figure 9. Thus, due to successive road shocks, the control member and the hub may have a step by step relative movement which increases the resistance to further movement of the paddle.

In the form of the invention shown in Figures 10, 11 and 12, there is but a single ratchet tooth F instead of the multiplicity of teeth as indicated on the ratchet $D^3$ and instead of the progressively narrowing slot $E^2$ a similar and relatively shorter slot $F^{14}$ is used. This slot, however, instead of tapering out entirely at its ends, runs into slots $F^{15}$ at each end, which slots are of constant width and depth. Thus when the clockwise movement of the hub is sufficient to cause the dog $F^4$ to engage the tooth F, further movement of the paddles and the hub will be along the portions $F^{15}$ of the slots and thus a constant resistance is provided. In the reverse or counter-clockwise movement, due to rebounding, the control member E moves with the hub D, as above described in connection with the first form of the invention, retaining the maximum resistance until the lever $F^8$ strikes the pin or projection $F^{13}$. This causes the lever $F^8$ to swing to the left as shown in Figure 11, and moves the portion $F^7$ lying within the cavity $F^3$ in the member $F^2$ downward and disengages the dog $F^4$ from the tooth F.

In the form of the invention shown in Figures 13, 14 and 15, the control member H provides through the wider and deeper slot $H^1$ a by-pass which is of constant length and width. Thus during the clockwise movement of the paddle $G^1$, since at this time the control member H is stationary, a constant resistance is provided. It is not an increasing resistance as provided by the two forms above described. On the reverse or rebound movement of the paddle the control member H is picked up by the hub G and the two move together. This causes a counter-clockwise movement of the control member H and moves the wider and deeper notch $H^1$ so that it is blocked or sealed by the baffles $C^3$ and it moves the narrower and shallower slot $H^2$ into the position so that its end is no longer closed or sealed by the baffle $C^3$ and it thus provides a by-pass past the baffle. Since the slot $H^2$ is of constant width and depth, it provides a constant resistance, but a resistance which is greater than that provided by the slot $H^1$ and thus in the reverse or rebound movement of the device as shown in Figures 13, 14 and 15, an increased but constant resistance is provided after the initial phase of the reverse movement. The slots $H^1$ and $H^2$ are so positioned on the member H that the slot $H^2$ is unsealed before the slot $H^1$ is sealed. For a brief interval both are open and both provide by-passing and thus at all times in the cycle of operation, one or the other of the slots $H^1$ and $H^2$ is in a position to furnish a by-pass.

I claim:

1. In a shock absorber, a housing, a member movably mounted therein, means within the housing for co-operation with the movably mounted member for applying an increasing resistance to the movement of said movable member in one direction, and for maintaining the resistance in the reverse direction at the maximum which it has attained during movement in the initial direction.

2. In a shock absorber, a housing, a member movably mounted therein, means within the housing for co-operation with the movably mounted member for applying a progressively increasing resistance to the movement of said movable member in one direction, and means for maintaining the resistance in the reverse direction at the maximum which it has attained during movement in the initial direction.

3. In a shock absorber, a housing, a member movably mounted therein, means within the housing for applying increasing resistance to the movement of said movable member, and for maintaining the resistance at the maximum which it has attained, said means including a resistance controlling member mounted for movement and adapted to furnish a by-pass past the movable member.

4. In a shock absorber, a housing, a member movably mounted therein, means within the housing for applying increasing resistance to the movement of said movable member, and for maintaining the resistance at the maximum which it has attained, said means including a resistance controlling member adapted to furnish a by-pass past the movable member, said means normally stationary and disconnected from said movable member, and means for connecting the two, whereby they move together, and means for disconnecting them.

5. In combination in a shock absorber, a housing, a rotor adapted to move in one direction and to reverse its direction of movement, means within the housing mounted for co-operation with the rotor, for providing an increasing resistance to movement of the rotor in the initial direction, and for maintaining the greatest resistance attained.

6. In combination in a shock absorber, a housing, a rotor adapted to move in one direction and to reverse its direction of movement, means within the housing mounted for co-operation with the rotor for providing an increasing resistance to movement of the rotor in one direction, and means for maintaining the greatest resistance attained during movement in said direction when the rotor moves in the reverse direction.

7. In combination in a shock absorber, a housing, a rotor adapted to move in one direction and to reverse its direction of movement, means within the housing mounted for co-operation with the rotor, for providing a progressively increasing resistance to movement of the rotor in the initial direction, and additional means for maintaining the greatest resistance attained.

8. In combination in a shock absorber, a housing, a rotor, means for providing an increasing resistance to movement of the rotor and for maintaining the greatest resistance attained, said means including a resistance controlling member mounted for movement and positioned within the housing and adapted to furnish a by-pass past the rotor.

9. In combination in a shock absorber, a housing, a rotor, means for providing an increasing resistance to movement of the rotor and for maintaining the greatest resistance attained, said means including a resistance controlling member positioned within the housing and adapted to furnish a by-pass past the rotor, and being normally stationary and out of engagement with the rotor, and means for engaging the two and additional means for disengaging them.

10. In combination in a shock absorber, a housing, a rotor, means for providing a progressively increasing resistance to movement of the rotor in one direction, and for maintaining the greatest resistance attained during movement in said direction when the rotor moves in the reverse direction, said means including a resistance controlling member positioned within the housing and adapted to furnish a by-pass past the rotor.

11. In combination in a shock absorber, a housing, a rotor, means for providing a progressively increasing resistance to movement of the rotor in one direction, and for maintaining the greatest resistance attained during movement in said direction when the rotor moves in the reverse direction, said means including a resistance controlling member positioned within the housing and adapted to furnish a by-pass past the rotor, and being normally stationary and out of engagement with the rotor, and means for engaging the two and additional means for disengaging them.

12. In a shock absorber, a housing, a rotor, means for providing a progressively increasing resistance to movement of said rotor in one direction and for providing a constant resistance to reverse movement of the said rotor, said constant resistance being the greatest resistance attained during the movement of said rotor, and means for reducing the resistance to reverse movement at a predetermined point in the cycle of operation of the rotor.

13. In a shock absorber, a housing, a rotor within said housing, a paddle on said rotor, a by-pass to permit escape past said paddle, a resistance controlling member, said by-pass formed in said member, the by-pass being of varying cross sectional area and adapted to furnish a progressively increasing resistance to movement of said paddle, said resistance element normally stationary and out of engagement with said rotor, means for engaging said element with said rotor, whereby the two move together, and means for disengaging them.

14. In a shock absorber, a housing, a rotor within said housing, means for furnishing a progressively increasing resistance to movement of said rotor in one direction and for maintaining the maximum resistance during a portion of the reverse movement of said rotor, said means including a resistance controlling element provided with a by-pass of varying cross sectional area, said controlling element normally stationary and disengaged from said rotor, and means for engaging the two whereby they move together, and means for disengaging them at a predetermined point in their movement.

Signed at Chicago, county of Cook and State of Illinois, this 31st day of May 1930.

CHARLES H. CHAPIN.